C. J. GUSTAFSON.
SADDLE FOR MOTOR CYCLES.
APPLICATION FILED APR. 22, 1915.
1,152,172.
Patented Aug. 31, 1915.
2 SHEETS—SHEET 1.
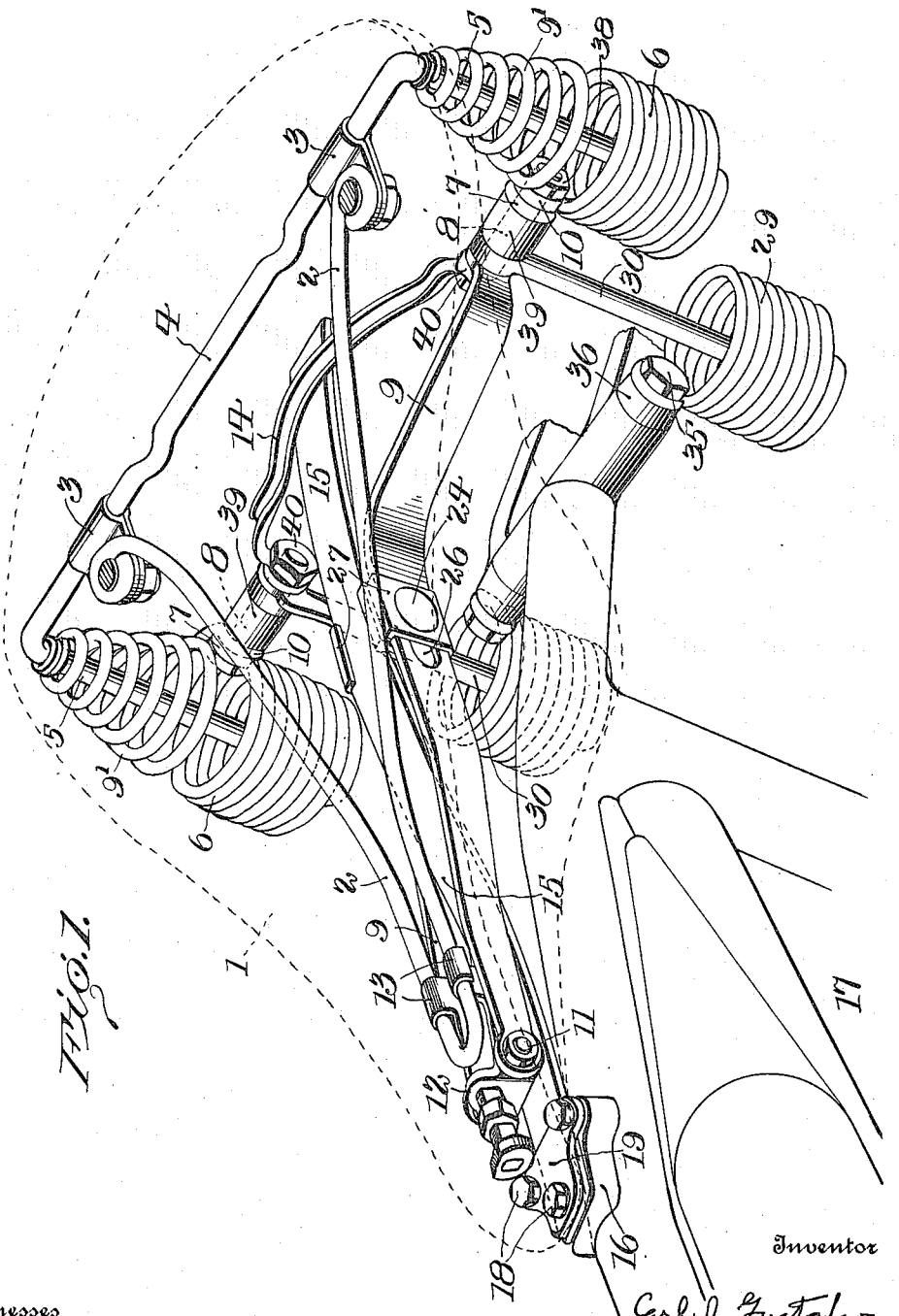

C. J. GUSTAFSON.
SADDLE FOR MOTOR CYCLES.
APPLICATION FILED APR. 22, 1915.
1,152,172.
Patented Aug. 31, 1915.
2 SHEETS—SHEET 2.
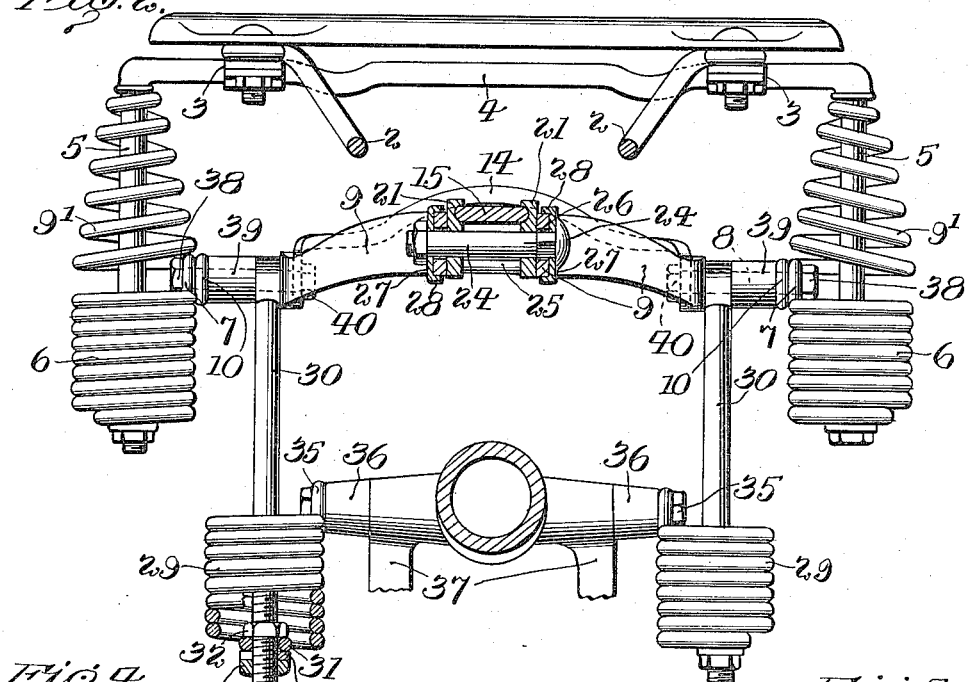
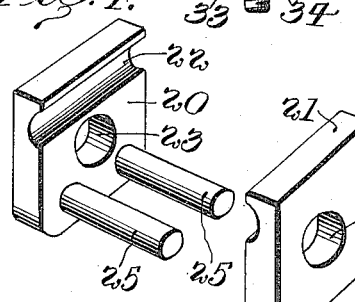
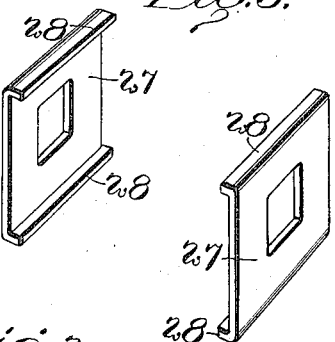
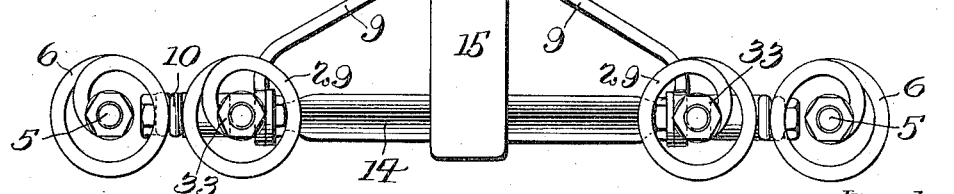
Witnesses
Inventor.
Carl J. Gustafson
By Shurtward Mason
Attorneys

UNITED STATES PATENT OFFICE.

CARL J. GUSTAFSON, OF SPRINGFIELD, MASSACHUSETTS, ASSIGNOR TO HENDEE MANUFACTURING COMPANY, A CORPORATION OF MASSACHUSETTS.

SADDLE FOR MOTOR-CYCLES.

1,152,172.　　　　Specification of Letters Patent.　　Patented Aug. 31, 1915.

Application filed April 22, 1915. Serial No. 23,082.

*To all whom it may concern:*

Be it known that I, CARL J. GUSTAFSON, a subject of the King of Sweden, residing at Springfield, in the county of Hampden, State of Massachusetts, have invented certain new and useful Improvements in Saddles for Motor-Cycles, of which the following is a description, reference being had to the accompanying drawing and to the figures of reference marked thereon.

The invention relates to new and useful improvements in saddles for motorcycles, and more particularly to the supporting means for the saddle.

An object of the invention is to provide a saddle supporting means by which the saddle is supported, so that it may yield bodily vertically and also have the usual pivoted yielding support.

A further object of the invention is to provide a saddle having a supporting frame on which the saddle is yieldingly mounted, with a yielding three-point suspension for the frame which permits the frame to move bodily up and down.

A further object of the invention is to provide a supporting device of the above character, wherein the supporting frame for the saddle may have a yielding support centrally of the saddle and also yielding supports at each side of the rear end of the frame.

These and other objects will in part be obvious and will in part be more fully disclosed.

In the drawings which show by way of illustration one embodiment of the invention—Figure 1 is a perspective view of a saddle having my improved supporting means and showing the manner of connecting the same to the motorcycle frame; Fig. 2 is a transverse sectional view centrally through the saddle supporting clip and looking toward the rear end of the saddle; Fig. 3 is a bottom plan view of a portion of the saddle supporting frame and the saddle supporting spring, the clip being partly in section; Fig. 4 is a detail in perspective showing the clamping members for the leaf spring; and Fig. 5 is a detail in perspective, showing the clamping plates which secure the frame to the clip attached to the leaf spring.

The invention consists generally in providing a saddle having a supporting frame, which is pivoted to the seat at the forward end and yieldingly connected to the seat at its rear end, so that said saddle may have the usual pivoted yielding support, with a three-point suspension means for said frame. This suspension means consists of a leaf spring attached to the frame proper of the motorcycle, which spring is secured by a clip to the saddle supporting frame at a point substantially centrally of the saddle, while the saddle supporting frame is attached at each side at the rear end thereof to tension springs, which in turn are connected to the frame proper of the motorcycle.

Referring more in detail to the drawings, my improved saddle supporting means consists of a seat proper 1, which has the usual U-shaped brace 2 which is attached to the saddle and forms a part thereof, and this brace is provided with clips 3—3 through which extends a cross-rod 4. The cross rod 4 is bent downwardly at each end, as at 5, and said bent downwardly portions 5 are joined at their lower ends to tension springs 6. Each tension spring is provided with an eye 7, by which the same is secured to a projecting lug 8 on the supporting frame 9 of the saddle. Said downwardly projecting portion 5 is also surrounded by a compression spring 9′, which has an eye 10 at its lower end attached to the lug 8. The upper end of the compression spring 9′ bears against a suitable collar on the rod 4. The frame 9 extends to the forward end of the saddle and is pivoted at 11 to a clip 12 which is fastened to the saddle and also to the brace 2 by suitable ears 13. This supporting frame 9 has a connecting cross bar 14 at its rear end.

The saddle support, as above described and consisting of the frame and combined compression and tension springs, forms no part of my invention *per se*, and further description thereof is not thought necessary.

The supporting frame 9 is connected to a leaf spring 15. This leaf spring 15 is clamped to a lug 16, which in turn is secured to the frame 17 of the motorcycle. Said leaf spring is clamped to said lug by bolts 18, which pass through a holding plate 19 into the lug 16. The frame 9 is secured to this leaf spring by means of a clip consisting of side members 20 and 21, each of which is provided with a recess 22 adapted to receive the respective side edges of the leaf spring. Each side member is also provided with an opening 23, through which passes a clamping bolt 24. The member 20 is further provided with two projecting rods 25—25. These rods are rigidly connected to the member 20 and so adapted as to bear against the inner face of the member 21. The side pieces of the frame are adapted to bear respectively against the outer faces of the members 20 and 21. Each side piece is formed with a slot 26. A flanged washer plate 27 is placed over the clamping bolt 24, one at each end thereof, and the flanges 28 of these washer plates engage over the side edges of the side pieces of the frame 9. When the bolt 24 is inserted and the nut turned on the bolt, the washer plates 27 will be clamped against the outer faces of the side pieces of the frame 9 and inasmuch as the bolt 24 is above the rods 25, these rods become abutments or fulcrum points about which the side members 21 and 22 turn, so as to clamp the leaf spring. The slots 26 afford a slight adjustment for this clip which secures the frame to the leaf spring. The frame 9 is also supported at each side at the rear end thereof by tension springs 29. A rod 30 is secured to the projecting lug 8 at each side of the frame 9, and this rod extends down through the tension spring, the lower member of the tension spring being provided with an eye 31 through which the rod extends. Said rod is threaded and is provided with two nuts 32 and 33, one of which is above the eye 31 and the other below. A washer 34 is placed between the lower nut and the eye on the spring. The upper coil of each tension spring has an eye 35 which is attached to a projecting lug 36 on the rear fork 37.

The lug 8, above referred to, and as herein shown, is in the form of a bolt 38, which passes through the eyes 10 and 7 and thence through a collar 39 and then through an eye at the upper end of the rod 30, and the side pieces and end piece of the frame 9, the nut being screwed on to the inner end of this bolt for securing the same to the frame, thus forming a rigid projecting lug. By adjusting the nuts 32 and 33 the position of the rear end of the saddle may be varied slightly.

From the above description, it will be apparent that I have provided a saddle supporting frame on which the saddle is pivoted at its front end and on which the saddle is yieldingly supported at its rear end by combined tension and compression springs which permits the saddle to yield to the weight of the rider on said frame. This supporting frame has a three point yielding suspension, consisting of the leaf spring with the clip, which attaches the same to the supporting frame for the saddle centrally thereof and the tension springs which are secured to each side of said supporting frame at the rear end thereof. These three yielding supports permit the supporting frame for the saddle to move bodily up and down or permit the frame to yield to either side at the rear or in front, depending upon the way the weight of the rider is placed on the saddle.

It is obvious that minor changes in the details of construction and arrangement of parts may be made without departing from the spirit of the invention as set forth in the appended claims.

Having thus described my invention, what I claim as new and desire to secure by Letters Patent, is:

1. The combination of a seat, a supporting frame therefor, yielding means for supporting the seat on said frame, and a three point yielding suspension means for said supporting frame.

2. The combination of a seat, a supporting frame therefor, said seat being pivoted at its front end to said frame and yieldingly supported at its rear end by said frame, and a three point yielding suspension means for said frame.

3. The combination of a seat, a supporting frame therefor, said seat being pivoted at its front end to said supporting frame, combined compression and tension springs for supporting the rear end of the seat, and a three point yielding suspension means for said frame.

4. The combination of a seat, a supporting frame therefor, means for yieldingly supporting the rear end of the seat on said frame, yielding means located centrally of the frame for supporting the same, and yielding means located at each side of the rear end of said frame for supporting said frame.

5. The combination of a seat, a supporting frame therefor, a leaf spring adapted to be attached to the motor-cycle frame and to said supporting frame, and independent yielding means for supporting each side of the rear end of said frame.

6. The combination of a seat, a leaf spring adapted to be rigidly attached to the motor-cycle frame, means for supporting said seat centrally thereof on said leaf spring, and means for yieldingly supporting each side of said seat at the rear end thereof.

7. The combination of a seat, a leaf spring adapted to be rigidly attached to the motor cycle frame, means for supporting said seat centrally thereof, said supporting means including a clip adapted to grip said spring, and means for yieldingly supporting the rear end of said seat at each side thereof.

8. The combination of a seat, a supporting frame attached to the seat, a leaf spring adapted to be rigidly attached to the frame of the motorcycle and extending rearwardly in the plane of said frame, a clip for attaching the supporting frame of the seat to said leaf spring, and independent means for yieldingly supporting the rear end of said frame.

9. The combination of a seat, a supporting frame attached to the seat, a leaf spring adapted to be rigidly attached to the frame of the motorcycle and extending rearwardly in the plane of said frame, a clip for attaching the supporting frame of the seat to said leaf spring, a rod attached to said frame at each side thereof and depending from the frame, a tension spring adapted to be connected to each rod and adapted to be attached to the motorcycle frame.

10. The combination of a seat, a supporting frame attached to the seat, a leaf spring adapted to be rigidly attached to the frame of the motorcycle and extending rearwardly in the plane of said frame, a clip for attaching the supporting frame of the seat to said leaf spring, a rod attached to said frame at each side thereof and depending from the frame a tension spring adapted to be connected to each rod and adapted to be attached to the motorcycle frame, and means whereby the connection between the tension springs and the rods may be adjusted.

11. The combination of a seat, a supporting frame attached to the seat, a leaf spring adapted to be rigidly secured to the motorcycle frame and projecting rearwardly in the plane of the motor-cycle frame, a rod rigidly attached to the frame at each side thereof, a tension spring for each rod, said tension spring having an eye at its upper end adapted to be secured to a lug on the motorcycle frame, and means for adjustably connecting the tension springs to said rods.

12. The combination of a seat, a supporting frame pivoted at its forward end to said seat, a projecting lug at each side of said frame, a compression and tension spring attached to the seat at each side thereof at the rear end of the seat, and connected to the respective lugs on the supporting frame, a leaf spring adapted to be rigidly connected to the motorcycle frame, a securing clip for connecting said supporting frame to said leaf spring, a rod connected to each lug on the supporting frame and projecting downwardly therefrom, a tension spring for each rod, said tension spring being adjustably connected to its respective rod and adapted to be connected to a supporting lug on the motorcycle frame.

In testimony whereof, I affix my signature, in the presence of two witnesses.

CARL J. GUSTAFSON.

Witnesses:
JOHN D. STEPHENS,
JOHN T. CRONIN.

Copies of this patent may be obtained for five cents each, by addressing the "Commissioner of Patents, Washington, D. C."